United States Patent [19]

Takeda et al.

[11] Patent Number: 5,306,339
[45] Date of Patent: Apr. 26, 1994

[54] CERAMIC DIE FOR MOLDING GLASS MEMBER

[75] Inventors: Shuichi Takeda; Hideki Shishiba; Takeji Kajiura, all of Kanagawa, Japan

[73] Assignee: Kabushiki Kaisha Komatsu Seisakusho, Tokyo, Japan

[21] Appl. No.: 842,183

[22] PCT Filed: Sep. 20, 1990

[86] PCT No.: PCT/JP90/01210

§ 371 Date: Mar. 20, 1992

§ 102(e) Date: Mar. 20, 1992

[51] Int. Cl.$^5$ .............................. B28B 7/36
[52] U.S. Cl. ................... 106/38.27; 106/38.9; 65/374.12
[58] Field of Search ............. 106/38.27, 38.9; 65/374.12, 374.13

[56] References Cited

U.S. PATENT DOCUMENTS

| | | | |
|---|---|---|---|
| 4,251,254 | 2/1981 | Klomp et al. | 65/374.13 |
| 4,814,011 | 3/1989 | Kamohara et al. | 106/38.51 |
| 5,125,949 | 6/1992 | Hirota et al. | 106/38.9 |

FOREIGN PATENT DOCUMENTS

| | | |
|---|---|---|
| 55-167180 | 12/1980 | Japan . |
| 56-32379 | 4/1981 | Japan . |
| 61-146724 | 7/1986 | Japan . |
| 63-50335 | 3/1988 | Japan . |
| 63-151629 | 6/1988 | Japan . |

*Primary Examiner*—Karl Group
*Attorney, Agent, or Firm*—Armstrong, Westerman, Hattori, McLeland & Naughton

[57] ABSTRACT

In a die for molding a glass member, a ceramic die for glass molding characterized by having the press surfaces thereof formed of a boron type composite ceramics comprising (A) at least one $M^I B$ ceramic phase having a $B^I/B$ (wherein $M^I$ stands for at least one member selected from the group consisting of Ni, Cr, V, Nb, Ta, Mo, W and Mn) atomic ratio of 1/1 and (B) at least one IV-group diboride ceramic phase selected from the group consisting of $TiB_2$, $ZrB_2$, and $HfB_2$ and/or $(Cr, Ni)_3B_4$ ceramic phase. This glass molding die excels in durability, ability of mold release, molding accuracy, and productivity and, at the same time, fits the molding of any of a rich variety of species of glass.

9 Claims, 4 Drawing Sheets

(A) FINISHED SURFACE (B) 600°C × 1 HOUR

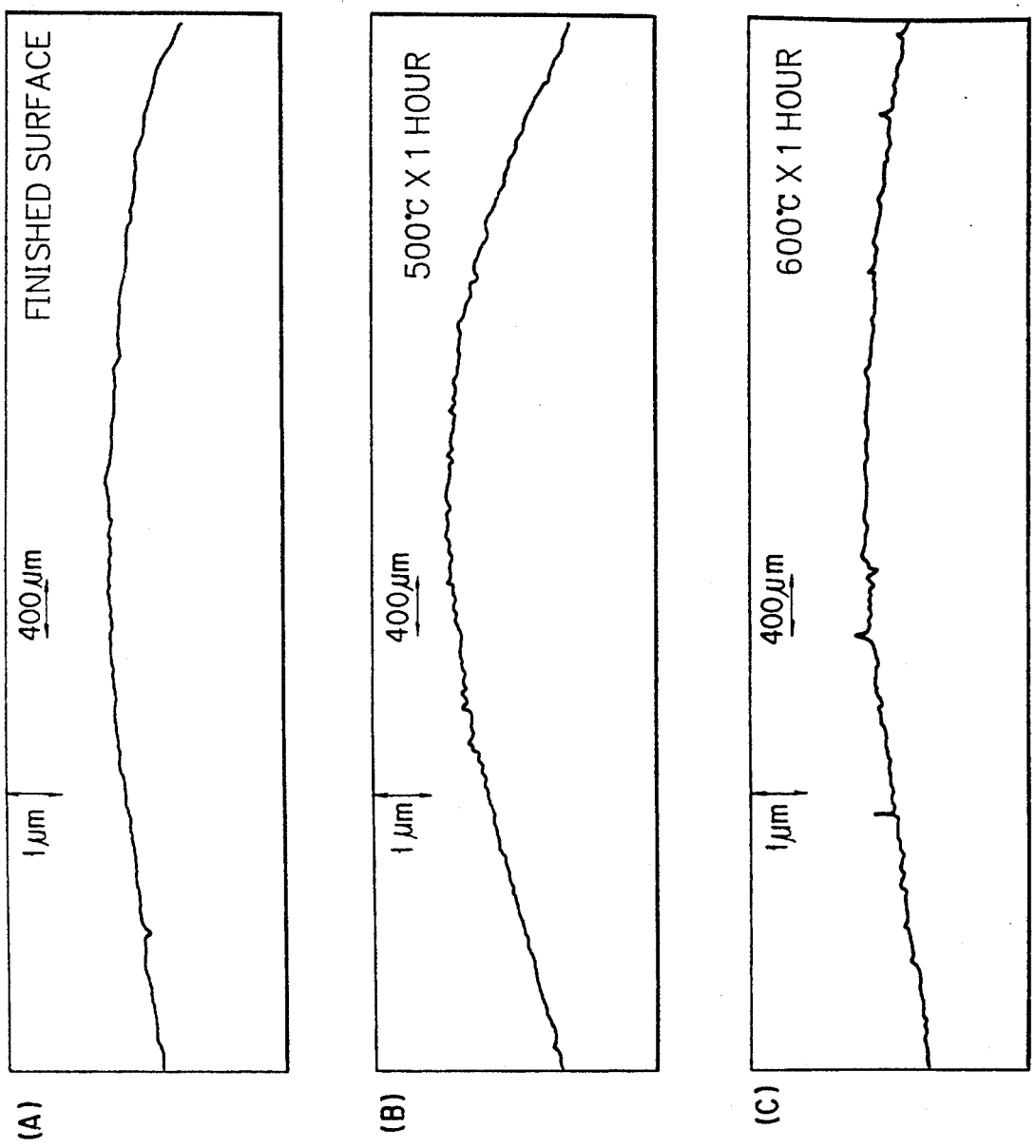

CERAMIC DIE FOR MOLDING GLASS MEMBER

FIELD OF THE INVENTION

This invention relates to a press molding die for a glass member such as an optical glass lens, and more particularly to a ceramic die for molding a glass member which ceramic die has pressing surfaces thereof formed of a boron type ceramic substance and consequently excels in durability, plasticizability, molding accuracy, and productivity and, at the same time, and fits the molding of any of a rich variety of species of glass.

BACKGROUND OF THE INVENTION

In recent years, efforts have been directed to modifying spherical lenses by impartation thereto of an aspheric surface for the purpose of simplifying the construction of an optical system using lenses, lightening the optical system, and enhancing the quality of images to be formed by the optical system. Since aspherical lenses entail a notably high cost for the work of processing subsequent to the step of molding, however, a need is felt for a highly accurate press molding technique which has no use for any extra grinding or abrading work. Since lenses are commodities of rich-variety small-quantity production, the need of a technique capable of molding a varying species of glass, particularly a high softening species of glass containing a rare earth element (molding temperature in the range of from 700° C. to 750° C.), has come to find approval.

As the characteristics which the material for a glass molding die is expected to possess, a) ideal resistance to oxidation at high temperatures and to chemical reactions at high temperatures and excellent durability, b) ideal resistance to glass reactions and seizure and an excellent ability of mold release, c) sparing susceptibility to infliction such as of scratch on die surface, high strength and high rigidity at high temperatures, an ability to allow highly accurate molding, d) resistance to fracture by thermal shock, and e) high thermal conductivity enough to allow quick absorption of heat from glass, curtail the pressing time, and consequently enhance the productivity of the molding operation may be cited, for example.

The materials which have been used for the conventional glass molding dies include metallic materials such as stainless steel, various refractory alloy steels, and cast iron, cermets such as cemented carbide having tungsten carbide bound with nickel, and ceramics such as SiC and $Si_3N_4$, for example.

None of the materials heretofore used in the conventional glass molding dies has fulfilled all the characteristics enumerated above. Such metallic materials as stainless steel, various refractory alloy steels, and cast iron, for example, are deficient in resistance to oxidation at temperatures exceeding 600° C. Since they suffer surface corrosion at temperatures exceeding 600° C., the molding with a die made of such a metallic material must be carried out as kept swept with $N_2$ gas. The dies of these metallic materials, therefore, have a problem of deficiency in productivity and durability. To make up for the deficiency in resistance to oxidation, a die made of such a metallic material and coated with platinum has been tied only to betray the disadvantage that it cannot be used for high-temperature molding because it offers poor resistance to glass reactions and succumbs to seizure at temperatures exceeding about 550° C.

The cemented carbide having tungsten carbide (WC) bound with Ni has the disadvantage that the highest working temperature is 600° C. by reason of resistance to oxidation. The ceramics such as SiC and $Si_3N_4$ enjoy ideal resistance to oxidation and nevertheless have the disadvantage that they are deficient in thermal conductivity and therefore liable to generate thermal stress and, as a result, exhibit inferior resistance to thermal shock to succumb readily to fracture. Thus, the molding with a die made of such a ceramic substance must consume much time enough to preclude occurrence of a temperature gradient in the mold. The dies of ceramics moreover have a problem of inability to improve productivity because they have a small capacity for absorbing heat from the glass after the molding and necessitate a long time for the molded glass to solidify completely.

Thus, the materials which have been used in the conventional dies are invariably short of fulfilling the characteristics which the glass molding dies are required to possess.

SUMMARY OF THE INVENTION

An object of this invention, therefore, is to solve the problems suffered by the materials for the conventional glass molding dies as described above and provide a glass molding die which fulfils such characteristics as enumerated above which a glass molding die is required to possess and which fits the molding of any of a rich variety of species of glass.

To accomplish the object described above according to this invention in a die for molding a glass member, there is provided a ceramic die for glass molding characterized by having the press surfaces thereof formed of a boron type composite ceramics comprising (A) at least one $M^I B$ ceramic phase having a $B^I/B$ (wherein $M^I$ stands for at least one member selected from the group consisting of Ni, Cr, V, Nb, Ta, Mo, W, and Mn) atomic ratio of 1/1 and (B) at least one IV-group diboride ceramic phase selected from the group consisting of $TiB_2$, $ZrB_2$, and $HfB_2$ and/or $(Cr, Ni)_3B_4$ ceramic phase.

In one embodiment of this invention, the boron type composite ceramic to be used in the die comprises at least one IV-group diboride ceramic phase selected from the group consisting of $TiB_2$, $ZrB_2$, and $HfB_2$ and a $M^I/B$ (wherein $M^I$ stands for at one member selected from the group consisting of Ni, Cr, V, Nb, Ta, Mo, W, and Mn) atomic ratio of 1/1 and contains $M^I B$ ceramic phase in a proportion in the range of from 3 to 50 vol %. In the boron type composite ceramic mentioned above, the $M^I B$ ceramic phase is desired to be a NiB ceramic phase having a NiB atomic ratio of 1/1. In another embodiment of this invention, the $M^I B$ ceramic phase mentioned above is a $(Ni, M^{II})B$ ceramic phase having a $(Ni, +B^{II})/B$ (wherein $M^{II}$ stands for at least one member selected from the group consisting of V, Nb, Ta, Cr, Mo, W and Mn) atomic ratio of 1/1 or is allowed to comprise at least two ceramic phases selected from among a CrB ceramic phase having a Cr/B atomic ratio of 1/1, a (Ni, Cr)B ceramic phase having a (Ni+Cr)/Br atomic ratio of 1/1, and a $(Cr, Ni)_3B_4$ ceramic phase.

In still another embodiment of this invention, the boron type composite ceramic is used in the die comprises a CrB ceramic phase having a Cr/B atomic ratio of 1/1, a (Ni, Cr)B ceramic phase having a (Ni+Cr)/B atomic ratio of 1/1, and a (Cr, Ni)$_3$B$_4$ ceramic phase and contains the (Ni, Cr)B ceramic phase in a proportion in the range of from 10 to 80 vol %.

In yet another embodiment of this invention, the boron type composite ceramic to be used in the die contains at least two ceramic phases selected from among a CrB ceramic phase having a Cr/B atomic ratio of 1/1, a (Ni, Cr)B ceramic phase having a (Ni+Cr)/B atomic ratio of 1/1, and a (Cr, Ni)$_3$B$_4$ ceramic phase in a combined proportion in the range of from 3 to 50 vol % and the remaining ceramic phase comprises at least one IV-group diboride ceramic phase selected from the group consisting of TiB$_2$, ZrB$_2$, and HfB$_2$.

In a further embodiment of this invention, the boron type composite ceramic to be used in the die comprises a CrB ceramic phase having a Cr/B atomic ratio of 1/1, a (Ni, Cr)B ceramic phase having a (Ni+Cr)/Br atomic ratio of 1/1, a (Cr, Ni)$_3$B$_4$ ceramic phase, and a (Ni, Cr, M$^{III}$)B ceramic phase having a (Ni+Cr+M$^{III}$)/B (wherein M$^{III}$ stands for at least one member selected from the group consisting of V, Nb, Ta, Mo, W, and Mn) atomic ratio of 1/1 and contains the (Ni, Cr, M$^{III}$)B ceramic phase in a proportion in the range of from 10 to 80 vol %.

The glass molding die contemplated by this invention enjoys the following outstanding die characteristics and advantages because the pressing surfaces thereof are formed of the specific boron type composite ceramic as described above.

(a) It excels in resistance to oxidation and to chemical reactions, exhibits notably improved durability, and enjoys a service life more than ten times as long as the die made of the conventional material.

(b) It excels in resistance to glass reactions and to seizure and exhibits a literally ideal ability of mold release.

(c) It allows molding of a glass member in the open air at elevated temperatures (up to 750° C.) and enables the press molding of a glass member with high accuracy. It realizes the heretofore unattainable highly accurate molding of a high softening glass and, at the same time, brings about an ample cutdown on the step of processing subsequent to the step of molding.

(d) Because of high thermal conductivity, it enables the molding to proceed quickly and enjoys enhanced productivity. It also excels in resistance to fracture by thermal shock (proofness against fracture).

The aforementioned and other objects, characteristics, modes of embodiment, and advantages of this invention will become apparent to those skilled in the art from the disclosure to be made hereinbelow with references to the accompanying drawings.

BRIEF DESCRIPTION OF THE DRAWINGS

FIG. 5(a,b,c) is a chart showing the results of a test performed on a Ni-based refractory alloy for surface roughness.

DETAILED DESCRIPTION OF THE INVENTION

The inventors, on the theory that various problems encountered in the die molding of optical glass lenses are ascribable for the most part to the properties (physical and chemical properties) of the material forming the pressing surfaces of the die, have searched through a wide variety of materials even including those so far unable to attract scientific curity, to learn that the conventional problems are solved by using such a boron type composite ceramic as is based on the aforementioned IV-group diboride ceramic phase.

To be specific, this invention is characterized by having the pressing surfaces of a glass molding die formed of a specific boron type composite ceramic. The boron type composite ceramic to be used in this invention is characterized by the fact that the M$^I$/B ceramic phase, specifically the ceramic phase of Ni/B, (Ni+-M$^{II}$)/B (wherein M$^{II}$ stands for Cr, Va to VII-a-group elements), Cr/B, (Ni+Cr)/B, or (Ni+Cr+M$^{III}$)/B (wherein M$^{III}$ stands for Va to VII-a-group elements), has the atomic ratio thereof amply controlled to 1/1. Without reference to the presence or absence of the substitution of Ni by some other metal, this ample control of the atomic ratio of the M$^I$/B ceramic phase to 1/1 enables the produced sintered article to enjoy improved density of texture and enhanced uniformity of the component phases of the composition, excel in strength, thermal condutivity, rigidity, fracture toughness, heatproofness (strength at elevated temperatures), resistance to oxidation, and corrosionproofness, and exhibits notably high repeatability and reliability. As the material for the glass molding die, therefore, this boron type composite ceramic is most suitable.

Now, the features of this invention as compared with the prior art will be described more specifically below with reference to the accompanying drawings.

Figure 1:
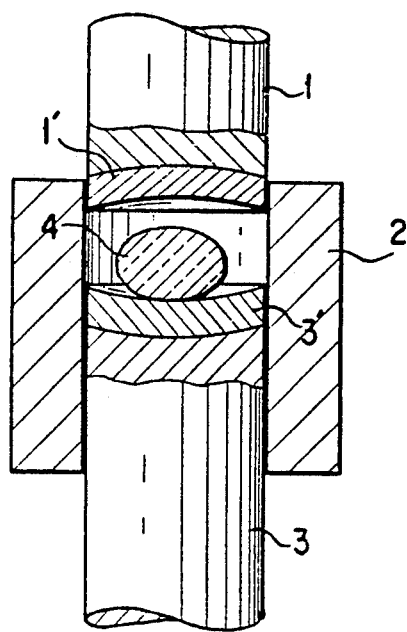
FIG. 1 is a schematic cross section of a glass molding die using a boron type composite ceramic according to this invention.

FIG. 1 is a cross section of a glass molding die using a boron type composite ceramic contemplated by this invention. In FIG. 1, the reference numerals 1 and 3 stand respectively for an upper segment and a lower segment of an optical glass molding die made of refractory steel. The reference numerals 1' and 3' stand respectively for upper and lower pressing surface parts made invariably of a boron type composite ceramic and bound or joined mechanically or chemically respectively to the upper segment 1 and the lower segment 3 as by soldering. The periphery of the molding die is encircled with a cylindrical die made of refractory steel. A glass block (gob) 4 is molded by being interposed between the upper and lower segments 1' and 3' of the boron type composite ceramic and pressed thereby.

When the upper segment 1' and the lower segment 3' of the die are made of the conventional material, they offer poor resistance to oxidation at elevated temperature, suffer from surface corrosion, and fail to obtain highly accurate molding. Though the pressing with the die may be performed as kept swept with N$_2$ gas to preclude this drawback, the die is still deficient in durability. As a countermeasure, therefore, the practice of creating a difference between the heating temperature T$_C$ of glass and the heating temperature T$_D$ of the die, completing the pressing work before the temperature of the die reaches the temperature of seizure, and recovering the shaped article of glass (such as, for example, a lens) has been a necessity. As a result, the lens thus molded assumes a temperature distribution, undergoes deformation due to the resultant thermal stress, and fails to acquire a prescribed shape and desired surface accuracy. The practice, therefore, requires to allow for an ample stock for grinding and give a complicated grinding work to the molded article.

In contrast to the prior art, this invention allows the temperature of the die itself to be elevated to the softening point of the glass being molded even in the open air which has been avoided as an impracticability by the prior art and enables the molded glass lens to enjoy notable improvement in shape and surface accuracy because the pressing surface (1' and 3') of the glass molding die are formed of the boron type composite ceramic possessed of the characteristics mentioned above. Owing to the ideal resistance of the boron type composite ceramic to oxidation, the pressing surfaces of the die are capable of retaining a smooth surface up to 750° C. and, therefore, capable of realizing the heretofore unattainable molding of a high softening glass at temperatures in the range of from 700° C. to 750° C. Thus, this invention allows highly accurate press molding of a high softening glass containing such a rare earth element as La and exhibiting high dispersibility and high refractance and permits a generous cutdown on the cost of the processing work subsequent to the step of press molding. Since the pressing surface parts of the die excel in resistance to oxidation, the die itself acquires improved durability and enjoys a service life more than 10 times as long as the service life of the conventional die when the comparison is made at the die temperature of the prior art.

As respects the problems due to the low thermal conductivity encountered by the dies using the conventional ceramic substances such as SiC and $Si_3N_4$, the die of this invention is substantially completely free from the problems because the boron type composite ceramic has a thermal conductivity closely approximating a metallic material.

The sintered article of a boron type composite ceramic to be used in this invention is defined essentially as a sintered article of a boron type composite ceramic which has in the basic composition thereof a sintered article of a mixed ceramic phase consisting of at least one IV-group diboride selected from among $TiB_2$, $ZrB_2$, and $HfB_2$ and a $M^IB$ (preferably NiB phase having a $M^I/B$ (preferably Ni/B) atomic ratio controlled to 1/1 and a sintered article of a mixed ceramic phase consisting of a CrB phase having a Cr/B atomic ratio controlled to 1/1, a $(Cr, Ni)_3B_4$ phase, and a (Ni, Cr)B phase having a (Ni+Cr)/B atomic ratio controlled to 1/1 and has additionally incorporated in these sintered articles a $NiM^{II}B$ ceramic phase having a $(Ni+M^{II})/B$ atomic ratio controlled to 1/1 in such a manner that the relevant compounds are suitably combined stoichiometrically.

The IV-group diboride ceramic to be used in this invention is desired to have high purity and a small particle diameter so that the atomic ratios of Ni/B, Cr/B, and $(Ni+M^{II})/B$ phases which jointly form the remainder of a sintered article may be amply controlled each to 1/1 and the produced sintered article may be improved in density, toughness, etc.

Since the CrB ceramic phase having a Cr/B atomic ratio of 1/1 and the $(Cr, Ni)_3B_4$ phase are only required to be present in the form of a sintered article, the starting materials to be used for these phases may be in any form.

The mixture of raw materials is prepared by uniformly mixing two or more species of the raw materials generally available in a finely divided form.

The sintered article of this invention is produced by sintering the mixture at a temperature exceeding 1,600° C. Though various methods (methods of sintered performed under a vacuum, in an inert atmosphere, or in a reducing atmosphere) are available for the purpose of their sintering, the sintering under application of the pressure of a solid article probes particularly desirable in point of stability and reproducibility of the phase composition.

As respects the properties of the component phases in the sintered article of this invention, the sintered article of the $TiB_2$-NiB type composite ceramic, for example, has a NiB phase having a Ni/B atomic ratio of 1/1 combined in a proportion in the range of from 3 to 50 vol % with a IV-group diboride.

Now, the sintered article of a composite ceramic will be described specifically below with respect to a $TiB_2$-NiB type composite ceramic. When this composite sintered article has $TiB_2$ particles uniformly distributed in a NiB ceramic phase having an Ni/B atomic ratio of 1/1, the produced sintered article acquires thermal conductivity, strength, etc. with extremely high repeatability from the NiB side through the $TiB_2$ side, depending on the volumetric ratio of the two raw materials. Specifically on the $TiB_2$ side, random and inevitable appearance of $Ni_4B_3$ phase and a $Ni_3B$ phase is curbed and the characteristics of sintered article such as thermal conductivity, strength, etc. are improved in reliability. For densification of the sintered article of this composite ceramic, the proportion of the NiB phase in the composite ceramic is required to be not less than 3 vol %. If the proportion of the NiB phase is less than 3 vol %, the $TiB_2$ particles are no longer capable of being thoroughly combined with the NiB phase and the number of discernible sites of mutual contact between the adjacent $TiB_2$ particles is increased. Generally, these sites of $TiB_2$-$TiB_2$ mutual contact are liable to gather pores and induce occurrence of numerous pores at the sites of mutual contact. When the sintering temperature is elevated for the purpose of alleviating the occurrence of these pores, abnormal growth of $TiB_2$ particles occur particularly at the sites of $TiB_2$-$TiB_2$ contact. The defects and the lack of uniformity in the microstructure mentioned above seriously impair the reliability of the sintered article in point of strength, thermal conductivity, etc. An increase in the proportion of the NiB phase is desirable for the densification of the sintered article under discussion. If the proportion of the NiB phase exceeds 50 vol %, however, the effect of the incorporation of the $TiB_2$ phase in the composite ceramic on such characteristics as rigidity and thermal conductivity of the sintered article is conspicuously impaired. It is, therefore, necessary to set the upper limit of the proportion of the NiB phase at 50 vol %.

DETAILED DESCRIPTION OF PREFERRED EMBODIMENTS

Now, the present invention will be described more specifically below with reference to working examples. These working examples are cited purely for the purpose of illustration and should not be construed as limiting the invention.

EXAMPLE 1

A boron type composite ceramic was prepared by mixing TiB$_2$ powder having an average particle diameter of 1 μm and NiB powder having an average particle diameter of 5 μm in a volumetric ratio of 3:2 in a ball mill. A sintered article of the boron type composite ceramic measuring 15 mm in diameter and 3 mm in height was obtained by cold molding the boron type composite ceramic and then heating it in a belt type high-pressure sintering apparatus under 10,000 atmospheres at 1,700° C. for 10 minutes.

Figure 4:
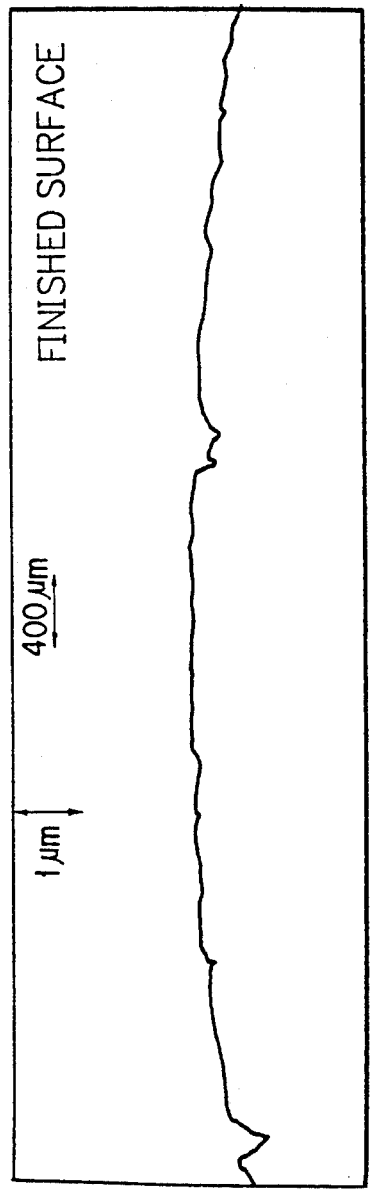
FIG. 4(a & b) is a chart showing the results of a test performed on a TiB$_2$-NiB type composite ceramic for surface roughness for the evaluation of resistance to oxidation.
Figure 4:
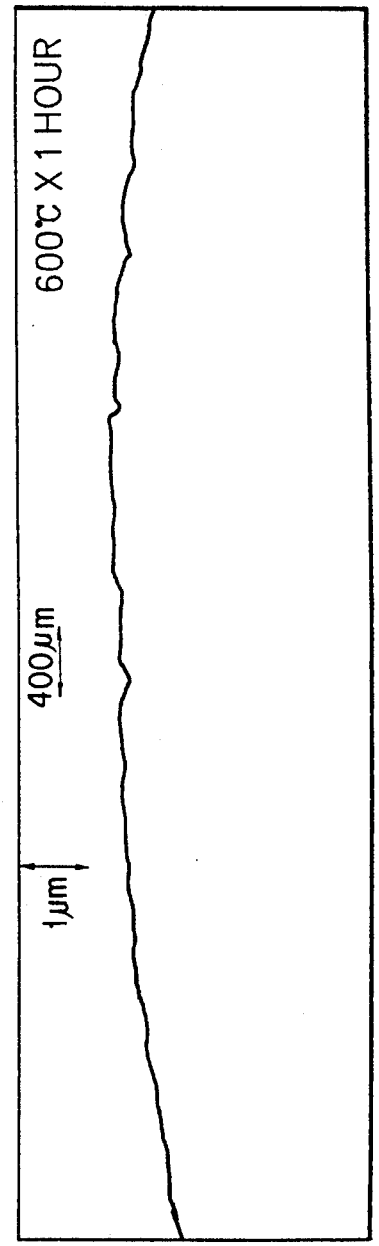

The surface of this sintered ceramic articles was ground with a diamond grindstone and finished by lapping. The sintered article with the finished surface was left standing at a prescribed temperature for one hour to evaluate the resistance of the surface to oxidation. During this test, the smooth lapped surface remained intact and showed no sign of degradation of the surface by oxidation up to 750° C. The results of the test for resistance to oxidation through the determination of surface roughness are shown in FIG. 4. For comparison, the same test was performed on a Ni-based refractory alloy. The results are shown in FIG. 5.

Figure 2:
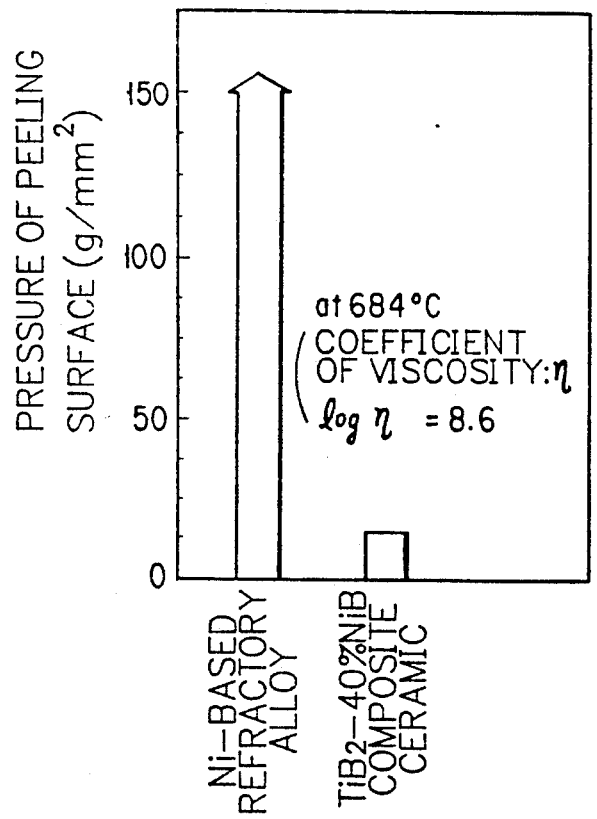
FIG. 2 is a graph showing the surface pressure registered during the separation of a molded material after the step of press molding in Example 1.

A die made of the aforementioned ceramic was operated for press molding a high softening glass BK7 (SiO$_2$-B$_2$O$_3$-R$_2$O type, wherein R stands for an alkali metal such as Na or K, for example) at elevated temperatures. Then, the die was evaluated as to the releasability of the molded glass article from the die. The results are shown in FIG. 2. For comparison, this test was performed with a die made of a Ni-based refractory alloy. The results are also shown in the same diagram.

The test for the ability of mold release was carried out by nipping a borosilicate glass (BK7) sample measuring 7 mm in diameter and 3 mm in height between the upper and lower segments of the die made of the materials mentioned above, pressing the sample in the vertically opposite directions under the conditions of 104 g/mm$^2$ of pressure of pressing surfaces and 684° C. of pressing temperature of both the glass and the die, separating the shaped glass sample from the upper and lower segments of the die, and determining the pressure required for the first separation on the surfaces of peeling. The mold releases was evaluated in terms of the magnitude of this pressure.

It is clearly noted from the results shown in FIG. 2 that while no separation was obtained even under a surface pressure of 150 g/mm$^2$ *in the die using a Ni-based refractory alloy, highly satisfactory separation was obtained under a pressure of* 17 g/mm$^2$ in the die using the aforementioned boron type composite ceramic (TiB$_2$-40% NiB). The molded glass consequently obtained with the latter die showed a satisfactory surface quality.

Figure 3:
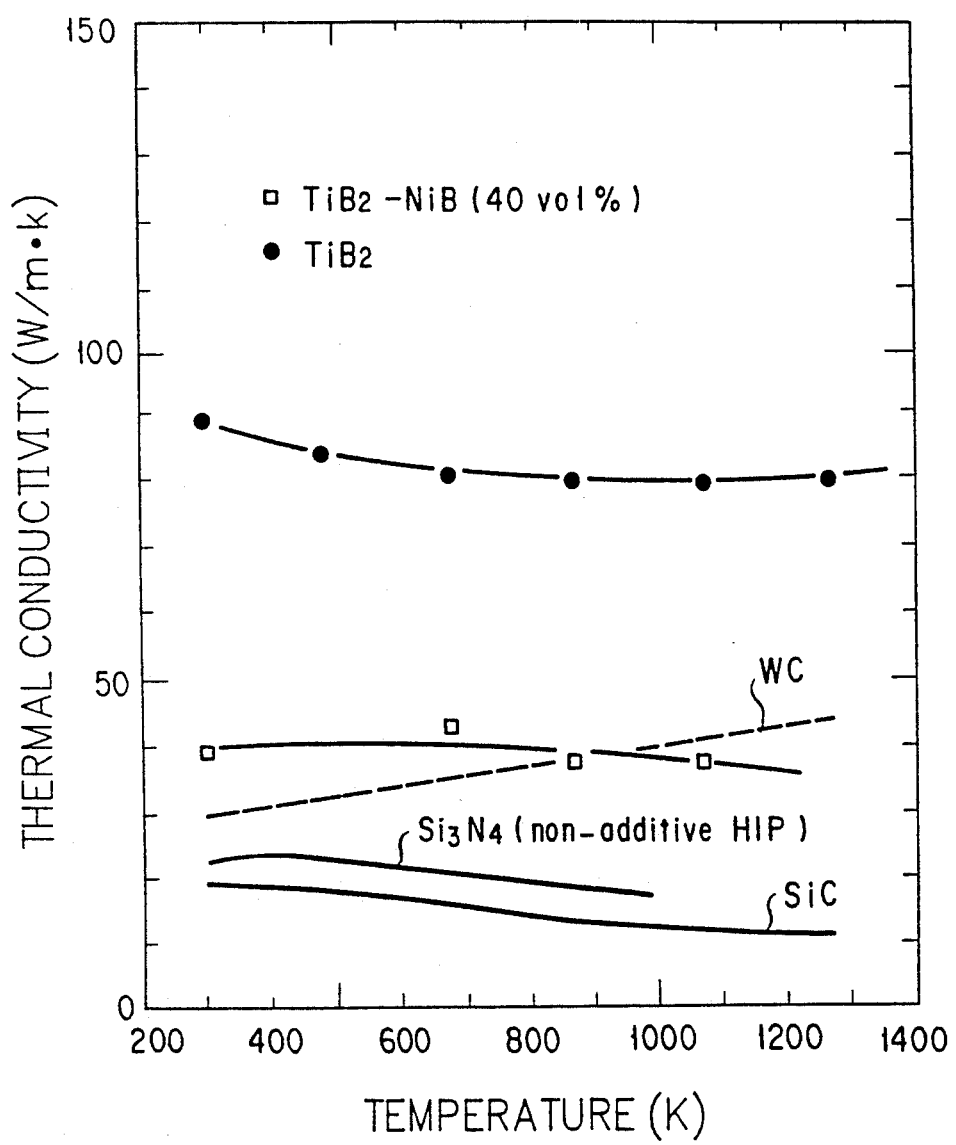
FIG. 3 is a graph showing magnitudes of thermal conductivity of various molding materials.

Then, the aforementioned TiB$_2$-NiB type composite ceramic was tested for changes in thermal conductivity at temperatures from room temperature up to 1,000° C. The results are shown in FIG. 3. This test was also performed on a simple TiB$_2$ ceramic. The results are shown in the same diagram. It is clearly noted from the results that the thermal conductivity of the TiB$_2$-NiB type composite ceramic varied between 40° C. and 85 (W/m·k), depending on the TiB content. The thermal conductivity is more desirable than that of the conventional ceramic materials such as SiC and Si$_3$N$_4$.

Now, working examples of production of various boron type composite ceramics which are advantageously usable in this invention will be described below.

EXAMPLE OF PRODUCTION 1

A sintered article was obtained by combining ZrB$_2$ powder having an average particle diameter of 3 μm and NiB powder having an average particle diameter of 5 μm in a volumetric ratio of 4:1, treating the resultant mixture in the same manner as in Example 1, and heating the processed mixture by the use of a belt type high-pressure sintering apparatus under 10,000 atmospheres at 1,800° C. for 10 minutes. The characteristics of the produced sintered article were not less than 98% of relative density, 1,650 kg/mm$^2$ of microhardness, 55 W/m·k of thermal conductivity, and 900 MPa of flexural strength. By the X-ray diffraction, this sintered article was found to have the composition of a ZrB$_2$-NiB two-phase composite ceramic.

EXAMPLE OF PRODUCTION 2

A sintering test was carried out by repeating the procedure of Example of Production 1, excepting HfB$_2$ powder having an average particle diameter of 2 μm was used to take the place of 70% by volume of the ZrB$_2$ powder. The relative density of the sintered article was identical with the boron type composite ceramic obtained in Example of Production 1 and the thermal density thereof was changed to 45 W/m·k. The sintered article was composed of a HfB$_2$ phase, a ZrB$_2$ phase (partially containing a mutual solid solution phase), and a NiB phase. By the sintering test performed in a total of ten runs, the dispersion of thermal conductivity characteristic among the samples was found to be within ±10%.

EXAMPLE OF PRODUCTION 3

A raw material for sintering was prepared by mixing 60 vol % of CrB powder having an average particle diameter of 2 μm with the balance of Ni powder having an average particle diameter of 2 μm and boron powder having an average particle diameter of 0.5 μm (added in an atomic ratio of 1/1). A sintered article was obtained by CIP molding the resultant mixed powder in the shape of a disc 30 mm in diameter and 5 mm in height and heating the disc by the use of a belt type high pressure sintering apparatus under 10,000 atmospheres at 1,600° C. for five minutes. By the powder X-ray diffraction, the sintering article was found to be composed of a CrB phase, a (Cr, Ni)$_3$B$_4$ phase, and a (Ni, Cr)B phase. On analysis by the EPMA, the Ni/Cr atomic ratio in the (Ni, Cr)B phase as found to be 9/1 and the volumetric proportion of the (Ni, Cr)B phase to be 25 vol %.

A sintered article containing a (Ni, CR)B phase of a (Ni+Cr)B atomic ratio of 1/1 in a volumetric proportion of not more than 10 vol % was produced by varying the mixing ratio of CrB powder, Ni powder, and B powder. This sintered article showed conspicuously degraded toughness. While the fracturing toughness of the sintered article of this example was 6 MNm$^{-3/2}$, that of a sintered article containing the (Ni, Cr)B phase in a volumetric proportion of less than 10 vol % was as low as 2 Mnm$^{-3/2}$.

A sintered article containing a CrB phase could not be obtained when it contained a (Ni, Cr)B phase having an approximate Ni/Cr atomic ratio of 9/1 in a volumetric proportion of not less than 80 vol %. The produced sintered article was conspicuously deficient in toughness and in high-temperature rigidity as well. For the toughness and rigidity to be maintained on highly desirable levels, therefore, the volumetric portion of the (Ni, Cr)B phase must be in the range of from 10 to 80 vol %.

EXAMPLE OF PRODUCTION 4

A raw material for sintering was prepared by mixing CrB powder, Ni powder, and B powder in the same volumetric ratio as in Example of Production 3 and then combining 20 vol % of the resultant mixture with the balance of a $TiB_2$ powder. This raw material was subjected to a sintering treatment under the same conditions as in Example of Production 3.

The sintered article was composed of $TiB_2$, CrB, (Ni, Cr)B, and $(Cr, Ni)_3B_4$ phases. The charractistics of this sintered article were not less than 99% of relative density, 7 $MNm^{-3/2}$ of fracture toughness, and highly desirable resistance to oxidation at 800° C. in the open air.

In a sintered article containing a ceramic phase composed of at least two members selected from among CrB, (Ni, Cr)B, and $(Cr, Ni)_3B_4$ in a volumetric proportion of not more than 3 vol %, the microstructure of the sintered article betrayed formation of pores and ununiform growth of particles for the same reason as described above with respect to the $TiB_2$-NiB type composite ceramic, indicating that the sintered article was conspicuously deficient in reliability of sintering characteristics. When the volumetric proportion mentioned above exceeded 50 vol %, the effect of the $TiB_2$ ceramic composite upon the characteristics of the sintered article such as rigidity and thermal conductivity was notably degraded. The volumetric proportion of the ceramic phase composed of at least two members selected from among CrB, (Ni, Cr)B, and $(Cr, Ni)_3B_4$, therefore, must be limited to 50 vol %.

In the same sintering test, a sintered article was obtained by preparing a diboride ceramic composed of $ZrB_2$ and $HfB_2$ powder in a volumetric ratio of $\frac{1}{2}$, combining 70 vol % of the diboride ceramic with 30 vol % of the aforementioned mixture of CrB powder, Ni powder, and B powder, and heating the resultant blend under 10,000 atmosphere at 1,800° C., for five minutes. The oxidation resisting characteristics of the produced sintered article at 800° C. in the open air were about twice as high as those of the $TiB_2$ system. (Here, the "oxidation resisting characteristics" were rated by the fact that the amount of increase of oxide by the heating at 800° C. for one hour was small and the ratio of this increase after a protracted continuation of the heating treatment was extremely small. )

EXAMPLE OF PRODUCTION 5

A raw material for sintering was prepared by combining 5 vol % of NbB having an average particle diameter of 1 μm and 3 vol % of MoB having an average particle diameter of 0.5 μm with the $ZrB_2$-NiB type mixed powder indicated in Example of Production 1. For this sintering test, a hot hydrostatic (HIP) device. A sintered article was produced by CIP molding the mixed powder in the shape of a disc 30 mm in diameter and 5 mm in height, hermetically sealing the disc in a Ta capsule after thermal deaeration, and heating the disc as enclosed in the capsule by the use of the HIP device under 2,000 atmospheres at 1,800° C. for 30 minutes.

The produced sintered article was found to possess relative density of not less than 98% and microhardness of about 20% higher than that of the sintered article (2,000 kg/mm²) produced in Example of Production 1. The flexural strength was increased to 1,200 MPa. By the X-ray diffraction, this sintered article was found to be a $ZrB_2$-(Ni, Nb, Mo)B two-phase composite ceramic.

The effect of the addition of Nb and Mo type borides to the $ZrB_2$-NiB two-phase composite system resides in enhancing rigidity and strength, improvement in repeatability of these properties, and allowing control of the thermal expansion coefficient of the sintered article. The average thermal expansion coefficient of the $ZrB_2$-NiB system at temperature between normal room temperature and 800° C. is $7.5 \times 10^{-6}$/°C. The addition thereto of Nb and Mo type borides lowers this value to $6.8 \times 10^{-6}$/°C.

In the composite ceramic mentioned above, when the volumetric proportion of the (Ni, $M^{II}$)B phase (wherein $M^{II}$ stands for V, Nb, Ta, Cr, Mo, W, or Mn) is not more than 3 vol % or not less than 50 vol % as indicated in the description of Example 1, the reliability of frexural strength is notably degraded and the composite effect of the $ZrB_2$ ceramic on the rigidity, thermal conductivity, etc. of the sintered article is impaired. Thus, the volumetric proportion of the (Ni, $M^{II}$)B phase must be limited to the range of from 3 to 50 vol %.

As another example of the aforementioned composite system, a sintered article was produced by preparing a $TiB_2$-$HfB_2$-NiB type mixed powder (containing NiB in a volumetric proportion of 20 vol %) having a $TiB_2HfB_2$ volumetric ratio of $\frac{1}{2}$, and combining this mixed powder with 5 vol % of WB having an average particle diameter of 0.5 μm, 10 vol % of CrB having an average particle diameter of 2 μm, and 2 vol % of MnB having an average particle diameter of 1 μm, and treating and resultant mixture under the same conditions as in Example of Production 5.

The sintered article thus obtained was found to have a low thermal expansion coefficient of $6.3 \times 10^{-6}$/°C. and a high temperature rigidity of 900 kg/mm² at 900° C. in addition to highly satisfactory resistance to oxidation.

In Example of Production 5, there was obtained a $ZrB_2$-(Ni, Nb, Mos)B two-phase composite ceramic. This composite ceramic tolerated inclusion of a very minute amount of NbB and MoB. These impurities had no adverse effect on the characteristics of the sintered article.

EXAMPLE OF PRODUCTION 6

A raw material for sintering was prepared by uniformly mixing Ta powder having an average particle diameter of 1 μm, W powder having an average particle diameter of 0.5 μm, and boron powder having an average particle diameter of 0.5 μm in proportions calculated to add TaB and WB in stoichiometric amounts of 3 vol % and 10 vol % with the raw material for sintering indicated in Example of Production 3. A sintered article was produced by CIP molding the resultant mixed powder in the shape of a disc 30 mm in diameter and 5 mm in height and heating the disc by the use of a belt type high-pressure sintering device under 10,000 atmospheres at 1,600° C., for 10 minutes. By the powder X-ray diffraction and the EPMA analysis of the sintered article, the produced sintered article was found to contain 50 vol % of a (Ni, Cr, Ta, W)B phase having a (Ni+Cr+Ta+W)/B atomic ratio of 1/1 in addition to the CrB phase, $(Cr, Ni)_3B_4$ phase, and the (Ni, Cr)B phase. As respects the characteristics of the sintered article, the fracture toughness was 6 $MNm^{-3/2}$, the same value as that of the sintered article of Example of Production 3, the microhardness showed a discernible increase (1,200 kg/mm² to 1,600 kg/mm²), and the heatproofness was improved as well as the resistance to oxidation. As already demonstrated in Example of Production 3, a conspicuous decrease occurred in the fracture toughness when the volumetric proportion of the (Ni, Cr, M)B phase (wherein M stands for Ta or W) was not more than 10 vol % and the CrB phase ceased to exist when the volumetric proportion exceeded 80 vol %. For the sintered article to acquire satisfactory fracture toughness, resistance to oxidation, and heatproofness, therefore, the volumetric proportion of the (Ni, Cr, M$^{III}$)B phase (wherein M$^{III}$ stands for V, Nb, Ta, Mo, W, or Mn) must fall in the range of from 10 to 80 vol %.

EXAMPLE OF PRODUCTION 7

A raw material for sintering was prepared by uniformly mixing V powder having an average particle diameter of 1 μm, Mo powder having an average particle diameter of 1 μm, and boron powder having an average particle diameter of 0.5 μm in proportions calculated to add VB and MoB in stoichiometric amounts of 5 vol % and 5 vol % with the raw material of TiB$_2$-CrB-Ni-B for sintering indicated in Example of Production 4. A sintered article was obtained by CIP molding the resultant powder in the shape of a disc 30 mm in diameter and 5 mm in height and heating the disc by the use of a belt type high-pressure sintering device under 10,000 atmospheres at 1,700° C., for five minutes. The sintered article thus obtained showed relative density of not less than 98%, fracture toughness of 7 MNm$^{-3/2}$, the value equal to that of the sintered article indicated in Example of Production 4, an increase of about 10% in microhardness, a small decrease in microhardness at an elevated temperature of 800° C. as compared with the sintered article of Example of Production 4, and improvement in heatproofness as well as in resistance to oxidation. As the metallic element M, the combination of Nb and Mn and the combination of Ta and W were also tested. The results indicate that the combination of Ta and W showed the best heatproofness. The effect of the volumetric proportion of the (Ni, Cr, M$^{III}$)B phase (wherein M$^{III}$ stands for V, Nb, TA, Mo, W, or Mn) on the characteristics of the sintered article was equal to that of the sintered articles of Examples of Production 1, 2, 4, and 5. This fact indicates that the radio of this phase must be maintained in the range of from 3 to 50 vol %.

We claim:

1. In a die for molding a glass member, a ceramic die for glass molding characterized by having press surface thereof formed of a boron containing composite ceramics comprising (A) at leas tone ceramic phase of a formula

M$^I$B, wherein M$^I$ stands for at least one member selected from the group consisting of Ni, Cr, V, Nb, Ta, Mo, W, and Mn having a M$^I$/B atomic ratio of 1/1 and (B) at least one ceramic phase of (b$_1$) IV-group diboride ceramic phase selected from the group consisting of TiB$_2$, ZrB$_2$, and HfB$_2$ and (b$_2$) (Cr, Ni)$_3$B$_4$ ceramic phase.

2. A glass molding ceramic die according to claim 1, wherein the boron containing composite ceramic to be used in said die contains the M$^I$B ceramic phase in a proportion in a range of from 3 to 50 vol %.

3. A glass molding ceramic die according to claim 2, wherein said M$^I$B ceramic phase is a NiB ceramic phase having a Ni/B atomic ratio of 1/1.

4. A glass molding ceramic die according to claim 2, wherein said M$^I$B ceramic phase is a ceramic phase of a formula (Ni, M$^{II}$)B, wherein M$^{II}$ stands for at least one member selected from the group consisting of V, Nb, Ta, Cr, Mo, W and Mn, having a (Ni+M$^{II}$)/B atomic ratio of 1/1.

5. A glass molding ceramic die according to claim 2, wherein said M$^I$B ceramic phase comprises at least two ceramic phases selected from the group consisting for a CrB ceramic phase having a Cr/B atomic ratio of 1/1, a (Ni, Cr)B ceramic phase having a (Ni+Cr)/B atomic ratio of 1/1, and a (Cr, Ni)$_3$B$_4$ ceramic phase.

6. A glass molding ceramic die according to claim 1, wherein the boron containing composite ceramic to be used in said die comprises a CrB ceramic phase having a Cr/B atomic ratio of 1/1, a (Ni, Cr)B ceramic phase having a (Ni+Cr)B atomic ratio of 1/1, and a (Cr, Ni)$_3$B$_4$ ceramic phase and contains said (Ni, Cr)B ceramic phase in a proportion in a range of from 10 to 80 vol %.

7. A glass molding ceramic die according to claim 1, wherein the boron containing composite ceramic to be used in said die contains at least two ceramic phases selected from the group consisting of a CrB ceramic phase having a Cr/B atomic ratio of 1/1, a (Ni, Cr)B ceramic phase having a (Ni+Cr)/B atomic ratio of 1/1, and a (Cr, Ni)$_3$B$_4$ ceramic phase in a combined proportion in a range of from 3 to 50 vol % and the remaining ceramic phase comprises at least one IV-group diboride ceramic phase selected from the group consisting of TiB$_2$, ZrB$_2$, and HfB$_2$.

8. A glass molding ceramic die according to claim 1, wherein the boron containing composite ceramic to be used in said die comprises a CrB ceramic phase having a Cr/B atomic ratio of 1/1, a (Ni, Cr)B ceramic phase having a (Ni+Cr)/B atomic ratio of 1/1, a (Cr, Ni)$_3$B$_4$ ceramic phase, and a ceramic phase of a formula (Ni, Cr, M$^{III}$)B, wherein M$^{III}$ stands for at least one member selected from the group consisting of V, Nb, Ta, Mo, W, and Mn, having a (Ni+Cr+M$^{III}$)/B atomic ratio of 1/1, and contains said (Ni, Cr, M$^{III}$)B ceramic phase in a proportion in a range of from 10 to 80 vol %.

9. A glass molding ceramic die according to claim 1, wherein the press surfaces are severally joined to an upper segment and a lower segment of the die, said die being made of a refractory steel.

* * * * *

UNITED STATES PATENT AND TRADEMARK OFFICE
CERTIFICATE OF CORRECTION

PATENT NO.   : 5,306,339
DATED        : April 26, 1994
INVENTOR(S)  : Takeda, et al It is certified that error appears in the above-indentified patent and that said Letters Patent is hereby corrected as shown below:

On the cover page, after Item [22], the following should be added:

--[30]   Foreign Application Priority Data

September 20, 1989  [JP]   Japan.........1-241680--.

Signed and Sealed this

Sixth Day of September, 1994

Attest:

BRUCE LEHMAN

*Attesting Officer*   *Commissioner of Patents and Trademarks*